UNITED STATES PATENT OFFICE.

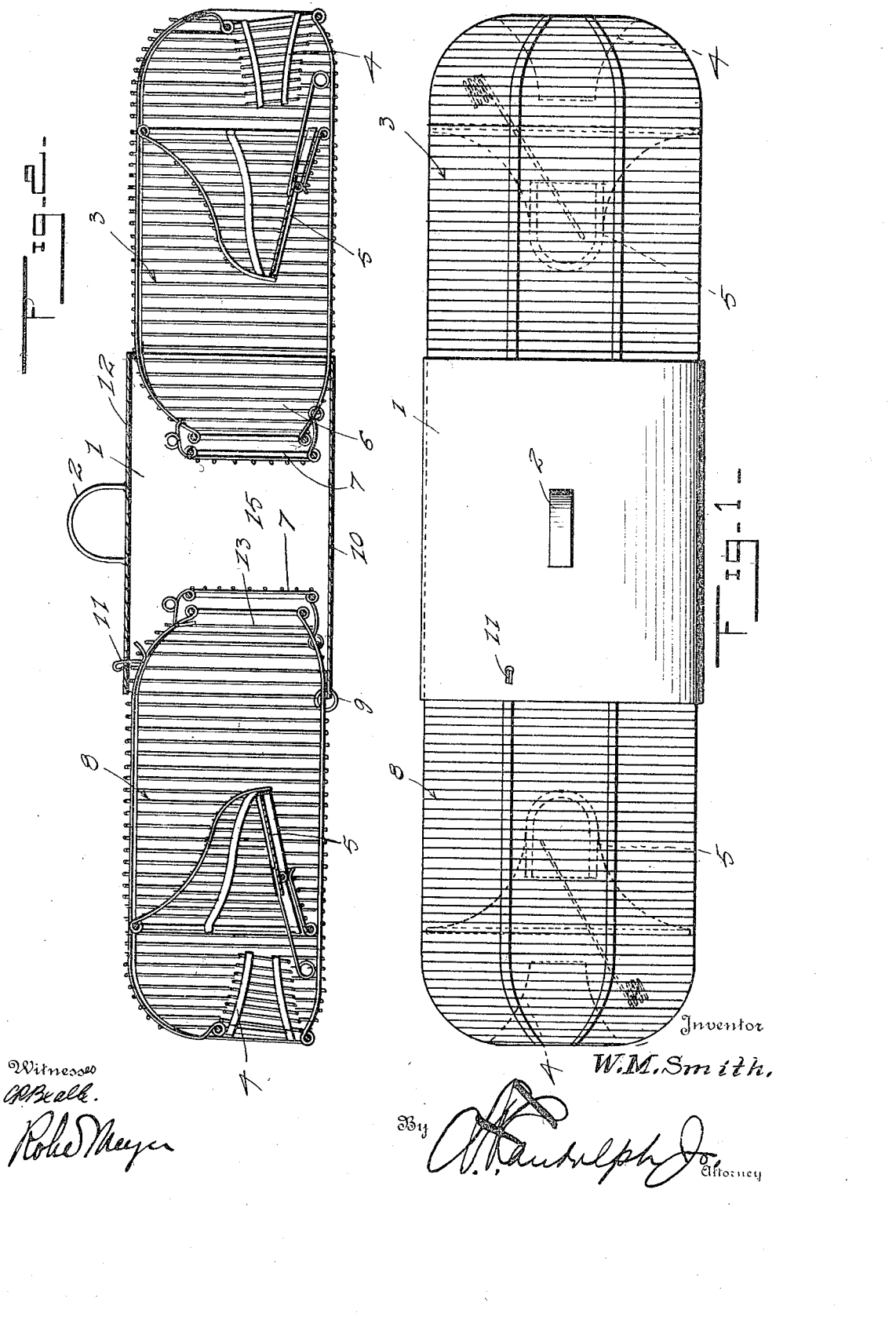

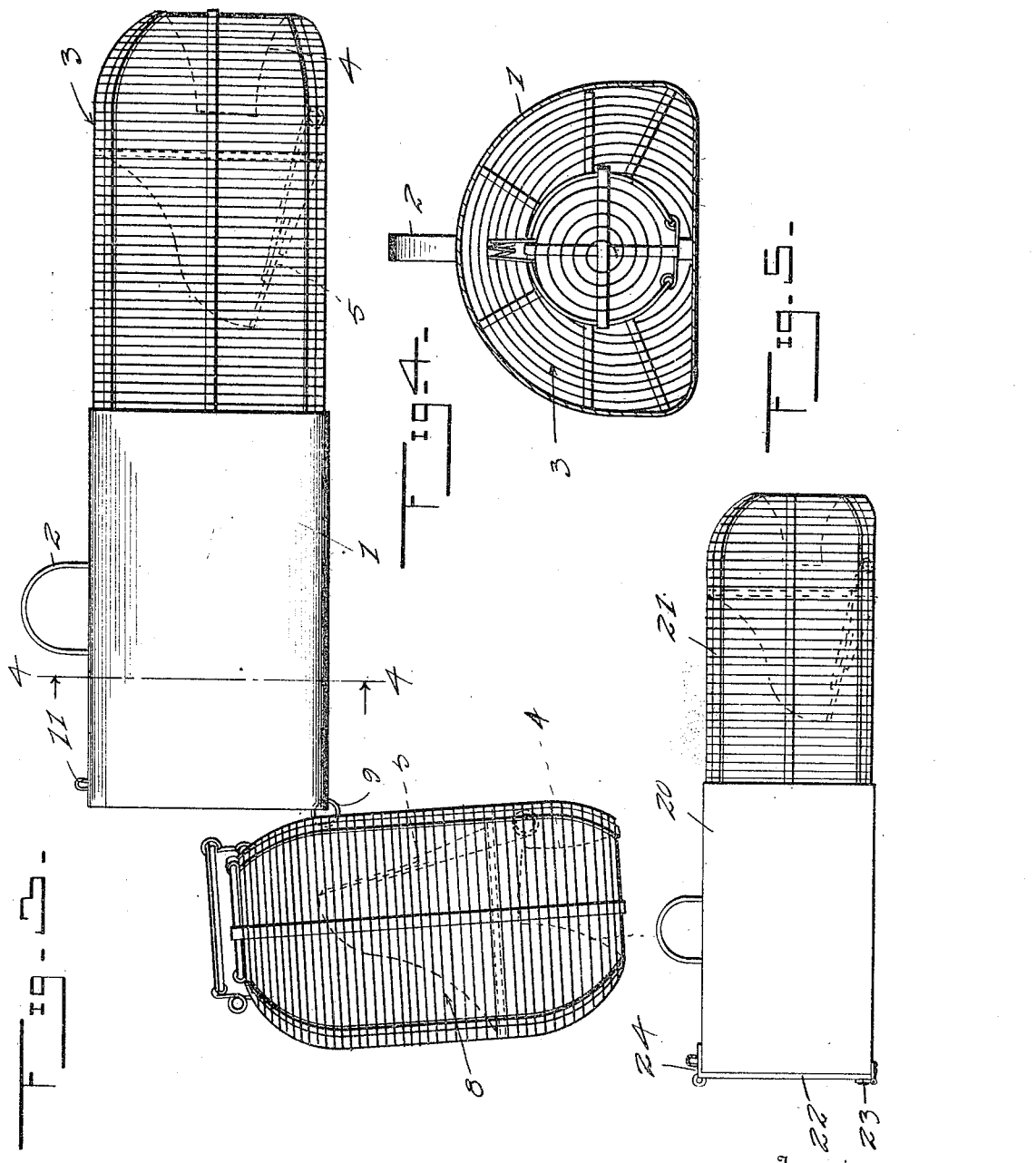

WILLIAM M. SMITH, OF DEMOCRAT, TEXAS.

TRAP.

1,208,677.  Specification of Letters Patent.  Patented Dec. 12, 1916.

Application filed July 12, 1916. Serial No. 108,926.

*To all whom it may concern:*

Be it known that I, WILLIAM M. SMITH, a citizen of the United States, residing at Democrat, in the county of Comanche and State of Texas, have invented certain new and useful Improvements in Traps; and I do hereby declare the following to be a full, clear, and exact description of the invention, such as will enable others skilled in the art to which it appertains to make and use the same.

This invention relates to a trap for catching various types of rodents such as rats, minks, weasels, or the like, and the primary object of the invention is to provide a trap wherein live bait may be used for luring the rodents, without endangering the life or safety of the bait.

Another object of this invention is to provide in a trap structure, a centrally disposed casing or body which is constructed of sheet metal and which has a trap of ordinary construction rigidly connected to and projecting outwardly from one end of the same, and a second trap identical in construction to the first named trap hingedly connected to and projecting outwardly from the opposite end of the body, and to provide means for locking the hingedly connected trap in its closed position for proper connection with the intermediate body.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of the improved trap. Fig. 2 is a longitudinal section through the trap. Fig. 3 is a side elevation of the trap showing the trap which is hingedly connected to the body section moved outwardly, and Fig. 4 is a section on the line 4—4 of Fig. 3. Fig. 5 is a side elevation of a modified form of the trap.

Referring more particularly to the drawings, 1 designates the body of the trap which is constructed of sheet metal or analogous material and has both ends open. A handle 2 is connected to the body 1 for facilitating the carrying of the trap for setting.

A trap structure generically indicated by the numeral 3 is rigidly connected to the body 1 and projects outwardly from one end of the same. The trap structure 3 is of the ordinary type of trap now in use, which is constructed of wire or metallic rods, and has a lead 4 which has a constricted mouth, and a pivotally supported door 5, which prevents the animal from passing out of the trap, after it has once entered the same. The inner end 6 of the trap 3 projects inwardly into the body 1 and it has the usual type of door 7 by means of which the animals are taken from the trap.

A trap structure 8, which is identical in construction to the trap structure 3 is hingedly connected to the end of the body 1 oppositely of the end to which the trap 3 is connected. The trap 8 is hingedly or pivotally connected to the body 1 by means of rings 9, which extend through the bottom 10 of the body 1 and through a portion of the bottom of the trap 8 as clearly shown in Fig. 2 of the drawings. A locking latch 11 is carried by the top 12 of the body 1 and extends downwardly therethrough for connection with the top of the inner end 13 of the trap 8 for locking the trap in its receiving or set position, as shown in Fig. 2 of the drawings.

The inner ends 6 and 13 of the trap structures 3 and 8 are spaced from each other, providing a space 15 within the body 1, which space is provided for receiving the bait, such as live chickens, rabbits, or any other suitable type of bait. In Fig. 3 of the drawings, the trap structure 8 is illustrated in an open or outwardly moved position, so as to permit of the placing of the bait within the body 1, or for removing the animals from either the trap structure 8 or 3.

After the bait has been placed within the space 15, the trap 8 is moved into its closed set position as illustrated in Fig. 2 of the drawings, and the trap is placed at any desired position, for attracting the rodent or animal to be caught. The animal will readily scent the bait within the space 15, and in endeavoring to get thereto will have to pass into one of the trap structures 3 or 8, and after it has passed into the trap structure, the pivoted doors 5 will prevent its passing out of the same. The trap being made of suitable mesh work or wire, will permit the animal to easily scent the bait, and will also prevent the animal from reaching the bait for killing it or injuring it in any way. The animal caught within the trap may be killed therein, or removed alive out of the end 7 or 13 of the trap structures as desired.

In Fig. 5 of the drawings, a modified form of the invention is illustrated which includes a housing 20 having a cap structure 21 attached to one end of the same and a hinged door 22 forming a closure for the other end of the body. The door 22 is hingedly connected to the body 20 as shown at 23, and any ordinary type of latch structure as indicated at 24 may be provided for holding the door 22 closed.

In reducing the invention to practice, certain minor features of construction, combination and arrangement of parts may necessitate alterations to which the patentee is entitled provided such alterations are comprehended within the scope of what is claimed.

What is claimed is:—

A device of the character described comprising a body having its ends open, a trap of ordinary construction rigidly attached to one end of said body with its outlet end positioned within the body, a door closing said outlet end, a second trap of ordinary construction hingedly connected to said body with its outlet end projecting into the body, a door closing the outlet end of the second trap, a catch carried by said body for an engagement with said second trap, said outlet ends being relatively spaced to provide a bait receptacle between said doors within the body, and the hinging of said second trap to the body permitting its outlet end to be swung out of said body so access may be gained to said doors and to the bait receptacle.

In testimony whereof I affix my signature in presence of two witnesses.

WILLIAM M. SMITH.

Witnesses:
C. L. CURB,
W. E. SMART.